(12) United States Patent
Rao et al.

(10) Patent No.: US 7,467,282 B2
(45) Date of Patent: Dec. 16, 2008

(54) MIGRATING A TRADITIONAL VOLUME TO A VIRTUAL VOLUME IN A STORAGE SYSTEM

(75) Inventors: Sriram Rao, San Jose, CA (US); John Edwards, Sunnyvale, CA (US); Douglas P. Doucette, Freeland, WA (US); Cheryl Thompson, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 379 days.

(21) Appl. No.: 11/099,925

(22) Filed: Apr. 5, 2005

(65) Prior Publication Data
US 2006/0224843 A1 Oct. 5, 2006

(51) Int. Cl.
*G06F 12/00* (2006.01)

(52) U.S. Cl. .................. 711/202; 711/165; 711/170; 711/171; 711/172; 711/173; 711/203; 711/205; 711/206; 711/207

(58) Field of Classification Search .................. None
See application file for complete search history.

(56) References Cited

U.S. PATENT DOCUMENTS 5,202,971 A * 4/1993 Henson et al. ............... 707/8
5,774,715 A * 6/1998 Madany et al. ............. 707/101
6,282,602 B1 8/2001 Blumenau
6,289,356 B1 * 9/2001 Hitz et al. ................. 707/201
2002/0112022 A1 * 8/2002 Kazar et al. ............... 709/217

FOREIGN PATENT DOCUMENTS

EP 0 798 656 10/1997
EP 0 926 585 6/1999

OTHER PUBLICATIONS

Tate, et al.: "IBM TotalStorage: Integration of the SAN Volume Controller, SAN Integration Server, and SAN File System" [Online], Mar. 2004, p. Front Cover, I-XXIV, 1-20, 97-112, 225-242, Back Cover, ISBN: 0738498351 Retrieved from the Internet: URL:http://www.redbooks.ibm.com/redbooks/pdfs/sg246097.pdf> [retrieved on Sep. 22, 2006].
"Volume Migration Using SAN Volume Controller, TIPS0400" [Online] Apr. 21, 2004, p. 1, Retrieved from the Internet: URL:http://www.redbooks.ibm.com/abstracts/tips0400.html> [retrieved on Sep. 22, 2006].

* cited by examiner

*Primary Examiner*—Kevin L Ellis
*Assistant Examiner*—Alan M Otto
(74) *Attorney, Agent, or Firm*—Blakely, Sokoloff, Taylor & Zafman LLP

(57) ABSTRACT

A file system migrates a traditional volume to a virtual volume without data copying. In an embodiment, a traditional volume index node is selected for migration. The traditional volume index node is converted to a virtual volume index node. In one embodiment, the virtual volume index node provides both physical address information and virtual address information.

17 Claims, 11 Drawing Sheets

MIGRATING A TRADITIONAL VOLUME TO A VIRTUAL VOLUME IN A STORAGE SYSTEM

FIELD OF THE INVENTION

At least one embodiment of the present invention pertains to storage systems, and more particularly, to a method and apparatus for migrating a traditional volume to a virtual volume in a storage system.

BACKGROUND

A storage system is a special-purpose processing system used to store and retrieve data on behalf of one or more client processing systems ("clients"). A storage system can be used for many different purposes, such as, to provide multiple users with access to shared data or to backup mission critical data.

A file server is an example of a storage system. A file server operates on behalf of one or more clients to store and manage shared files in a set of mass storage devices, such as magnetic or optical storage based disks or tapes. The mass storage devices may be organized into one or more traditional volumes of Redundant Array of Inexpensive Disks (RAID). The term "traditional volume" refers to a volume that has a fixed relationship with one or more physical mass storage devices, such as disks. A volume is a set of disks presented to an operating environment as a range of consecutively numbered logical blocks with disk-like storage and input/output semantics. Another example of a storage system is a device which provides clients with block-level access to stored data, rather than file-level access, or a device which provides clients with both file-level access and block-level access.

In conventional storage systems, there is a fixed relationship between a traditional volume and the disks that are associated with the traditional volume. This fixed relationship means that each traditional volume has full control over the disks that are associated with the volume. For example, only the traditional volume associated with the disk can read and/or write to the disk. Unused space within the disks associated with the traditional volume cannot be used by another traditional volume. Thus, even if a traditional volume is only using a fraction of the space on its associated disks, the unused space is reserved for the exclusive use of the traditional volume.

Another feature of the fixed relationship between a traditional volume and its associated disks, in conventional storage systems, is that the size of the traditional volume is equal to the capacity of the associated disks. This means that the size of the underlying physical storage dictates the size of the traditional volume. If a user wants to increase the size of the traditional volume, she must add disks to the physical storage (e.g., add a RAID group). Similarly, if the user wants to decrease the size of the traditional volume, she must remove disks from the physical storage.

SUMMARY OF THE INVENTION

Embodiments of the invention are generally directed to a system, for example a file system, that migrates a traditional volume to a virtual volume without data copying. In an embodiment, a traditional volume index node is selected for migration. The traditional volume index node is converted to a virtual volume index node. In one embodiment, the virtual volume index node provides both physical address information and virtual address information.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

A method and apparatus for migrating a traditional volume to a virtual volume is described. As described in greater detail below, in certain embodiments of the invention the method includes migrating the traditional volume to a virtual volume without data copying. A "virtual volume" refers to a logical container of data that can be sized, resized, managed, and moved independently from the underlying physical storage. A "logical aggregation of physical storage" refers to an entity that provides the connection between one or more virtual volumes and the underlying physical storage. For ease of description, the term "aggregate" is sometimes used when describing the "logical aggregation of physical storage."

Figure 1:
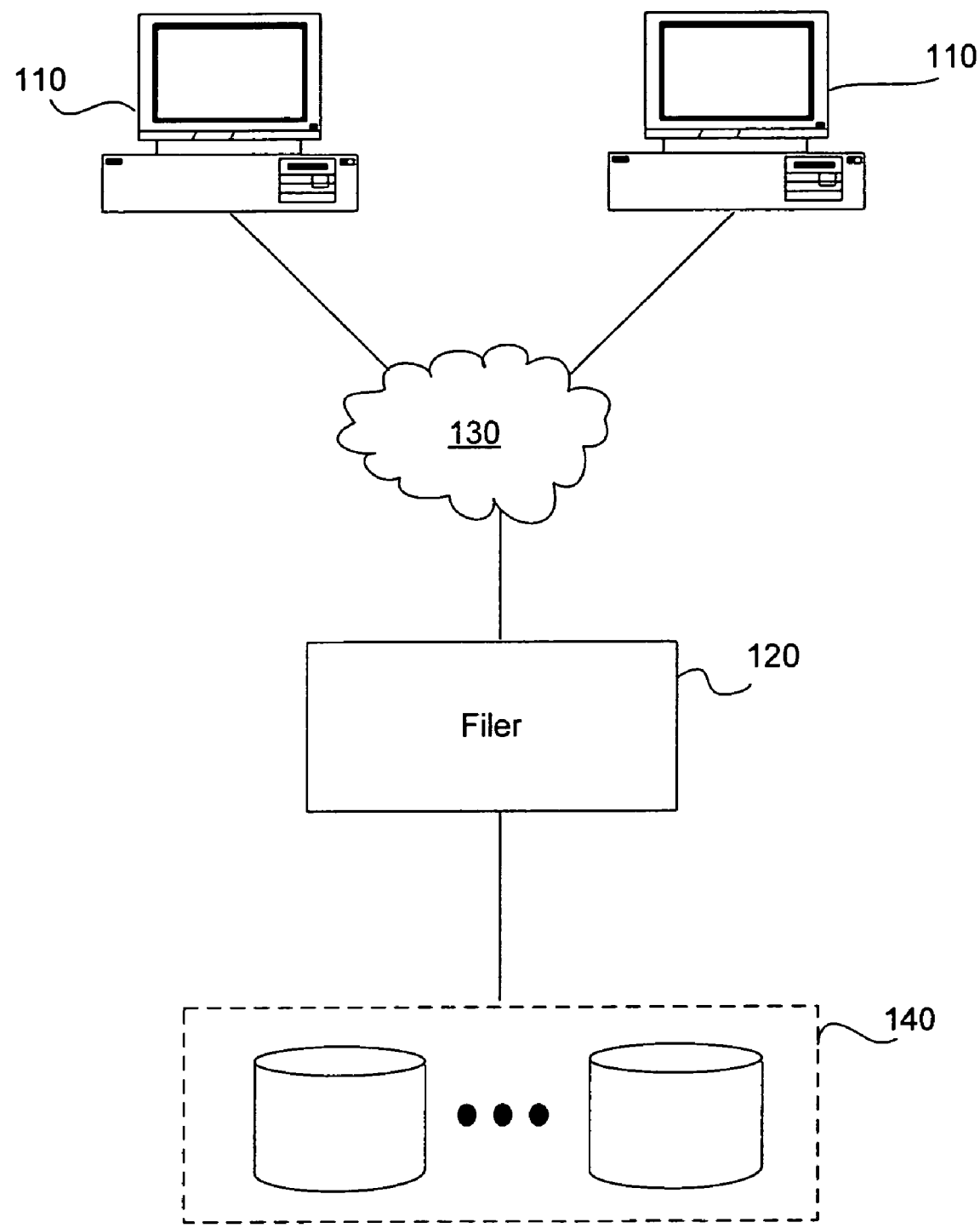
FIG. 1 shows a network environment that includes a storage system which implements the invention.

As noted above, the migration technique introduced herein can be implemented in a storage system. FIG. 1 shows a simple example of a network environment which incorporates a storage system 120. Note, however, that the migration technique introduced herein is not limited to use in traditional storage systems. For example, the technique can be adapted for use in other types of storage systems, such as storage systems which provide clients with block-level access to stored data or processing systems other than storage systems.

Storage system 120 is coupled locally to a storage subsystem 140 which includes a set of mass storage devices, and to a set of clients 110 through a network 130, such as a local area network (LAN). Each of the clients 110 may be, for example, a conventional personal computer (PC), workstation, or the like. Storage subsystem 140 is managed by storage system 120. For example, storage system 120 receives and responds to various read and write requests from the clients 110, directed to data stored in or to be stored in storage subsystem 140. The mass storage devices in storage subsystem 140 may be, for example, conventional magnetic disks, optical disks such as compact disks-read only memory (CD-ROM) or digital versatile/video disks (DVD) based storage, magneto-optical (MO) storage, or any other type of non-volatile storage devices suitable for storing large quantities of data.

Storage system 120 may have a distributed architecture; for example, it may include a separate N-("network") blade and D-(disk) blade (not shown). In such an embodiment, the N-blade is used to communicate with clients 110, while the D-blade includes the file system functionality and is used to communicate with the storage subsystem 140. Alternatively, storage system 120 may have an integrated architecture, where the network and data components are all contained in a single box. The storage system 120 further may be coupled through a switching fabric to other similar storage systems (not shown) which have their own local storage subsystems. In this way, all of the storage subsystems can form a single storage pool, to which any client of any of the storage systems has access.

Figure 2:
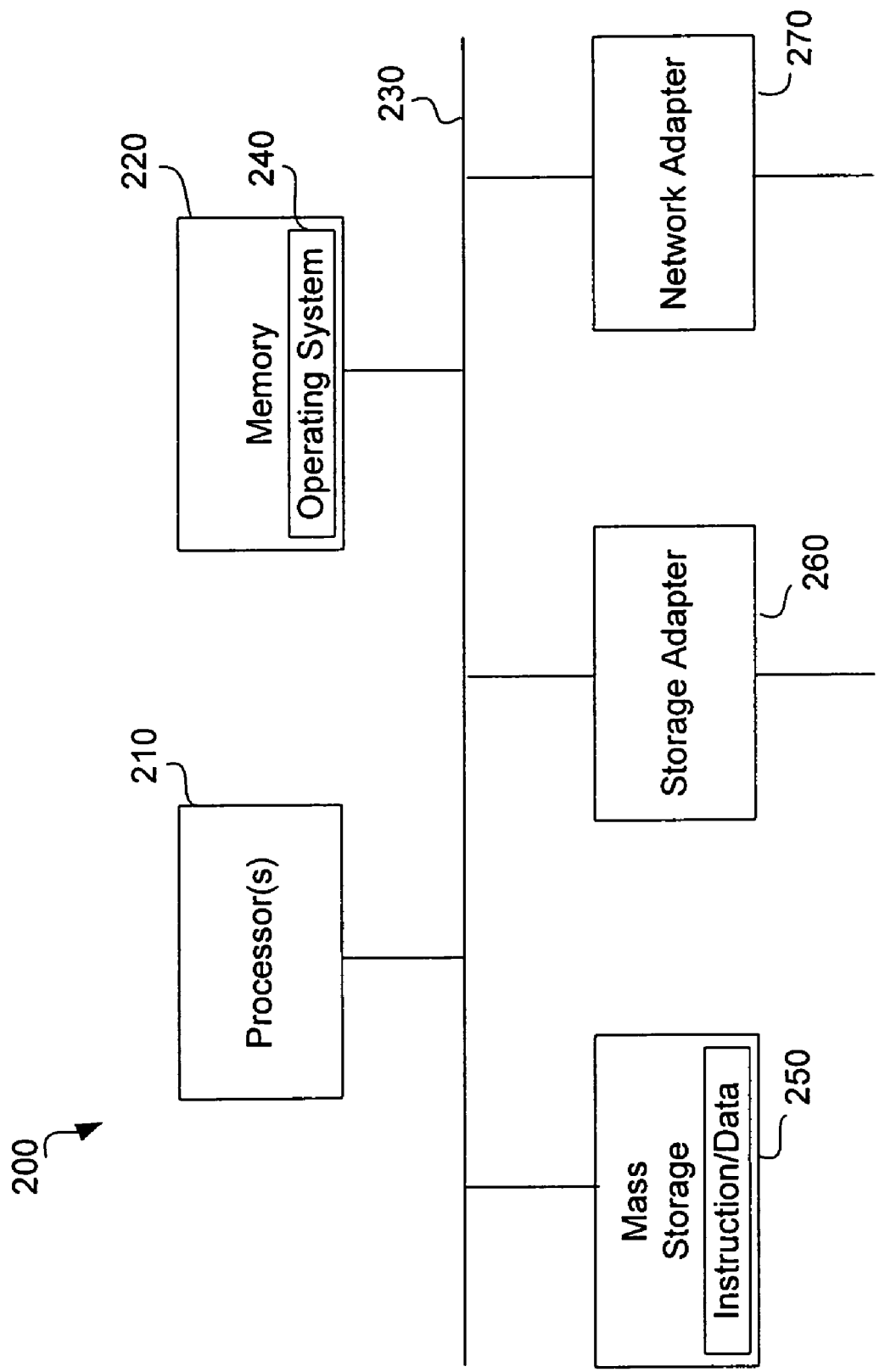
FIG. 2 is a block diagram showing the architecture of a storage system that can implement the invention.

FIG. 2 is a block diagram showing the architecture of storage system 120, according to certain embodiments of the invention. Certain standard and well-known components which are not germane to the present invention are not shown. Storage system 120 includes one or more processors 210 and memory 220 coupled to a system interconnect 230. System interconnect 230 shown in FIG. 2 is an abstraction that represents any one or more separate physical buses and/or point-to-point connections, connected by appropriate bridges, adapters and/or controllers. System interconnect 230, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

Processors 210 are the central processing units (CPUs) of a storage system (e.g., file sever 120, shown in FIG. 1) and, thus, control the overall operation of the storage system. In certain embodiments, processors 210 accomplish this by executing software stored in memory 220. Processor 210 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 220 is or includes the main memory of storage system 120. Memory 220 represents any form of random access memory (RAM), read-only memory (ROM), flash memory, or the like, or a combination of such devices. Memory 220 stores, among other things, operating system 240 of storage system 120, in which the capacity guarantee techniques introduced above can be implemented.

Also connected to processors 210 through the system interconnect 230 are one or more internal mass storage devices 250, a storage adapter 260, and a network adapter 270. Internal mass storage devices 250 may be or include any conventional medium for storing large volumes of data in a non-volatile manner, such as one or more magnetic or optical based disks. The storage adapter 260 allows storage system 120 to access storage subsystem 140 (shown in FIG. 1) and may be, for example, a Fibre Channel adapter or a Small Computer System Interface (SCSI) adapter. Network adapter 270 provides storage system 120 with the ability to communicate with remote devices, such as the clients 110 (shown in FIG. 1), over a network and may be, for example, an Ethernet adapter.

Figure 3:
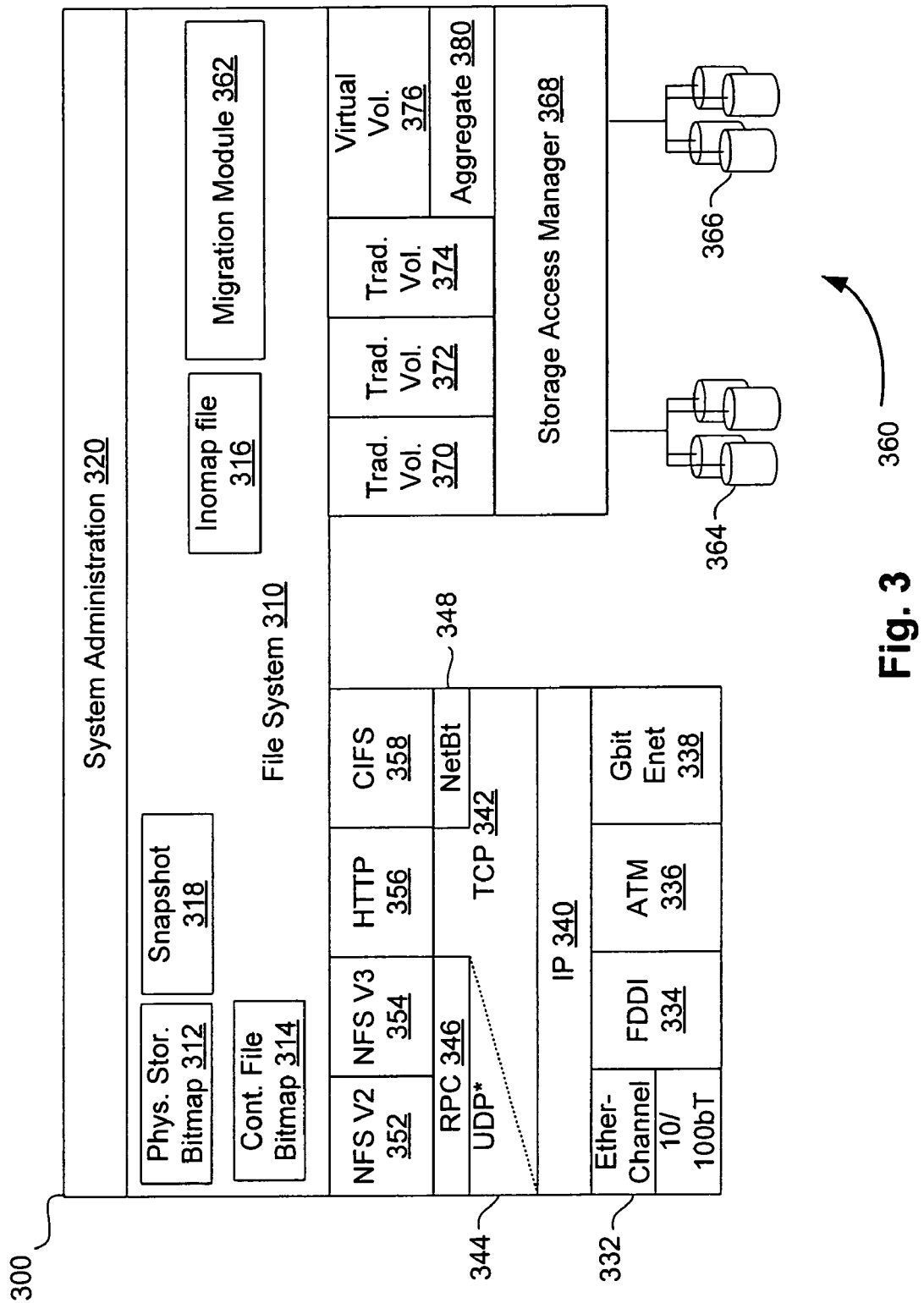
FIG. 3 is a block diagram illustrating selected aspects of the logical architecture of a storage system, according to an embodiment of the invention.

FIG. 3 is a block diagram illustrating selected aspects of the logical architecture of a storage system (e.g., its operating system), according to an embodiment of the invention. In an embodiment, operating system 300 includes a collection of coupled processing modules to handle client requests (e.g., requests from clients 110, shown in FIG. 1). A request from a client is initially received at the network drivers at the lower left, and moves up through the network protocol layers and the file system, eventually generating disk input/output (I/O) if necessary. When file system 310 finishes the request, it sends a reply back to the network. System administration layer 320 monitors and controls the modules below. In addition to the modules shown in FIG. 3, a kernel of operating system 300 may provide basic services such as process creation, memory allocation, message passing, and interrupt handling. In an alternative embodiment, operating system 300 may include more modules, fewer modules, and/or different modules.

In an embodiment, operating system 300 includes a number of network drivers to process client requests. The illustrated embodiment includes Ether-channel driver 332, Fiber Distributed Data Interface (FDDI) driver 334, Asynchronous Transfer Mode (ATM) driver 336, and gigabit Ethernet driver 338. In an alternative embodiment, operating system 300 may include more network drivers, fewer network drivers, and/or different network drivers.

Operating system 300 includes an implementation of Internet Protocols (IP) 340. In an embodiment, operating system 300 includes implementations of both Transmission Control Protocol (TCP) 342 and User Datagram Protocol (UDP) 344. In addition, the network layer may include implementations of Remote Procedure Call (RPC) 346 and NetBIOS over TCP/IP 348. Operating system 300 may also implement one or more of various higher-level network protocols, such as Network File System (NFS) 352-354, Common Internet File System (CIFS) 358, and/or Hypertext Transfer Protocol (HTTP) 356. Storage access manager 368 implements a high-level disk storage protocol, such as RAID, while a storage driver layer (not shown) implements a lower-level storage device access protocol, such as Fibre Channel Protocol (FCP) or SCSI.

File system 310 is application-layer software that manages the directory structure (e.g., the hierarchical structure) of the data stored in storage subsystem 360. For example, file system 310 manages read/write operations on the data stored in storage subsystem 360 (e.g., executes read/write operations on the disks in response to client requests). In one embodiment, file system 310 includes migration module 362. In an alternative embodiment, migration module 362 is implemented in a different layer of operating system 300 and/or is distributed across more than one layer (and/or more than one module) of operating system 300. As is further described below, with reference to FIGS. 7-11, migration module 362 provides logic to migrate a traditional volume (e.g., traditional volumes 370-374) to a virtual volume (e.g., virtual volume 376).

In one embodiment, file system 310 includes one or more snapshots 318. Snapshot 318 is a read-only copy of at least a portion of file system 310. Snapshot 318 uses a copy-on-write technique to avoid duplicating data blocks that are the same in snapshot 318 as they are in file system 310. That is, snapshot 318 is initially a copy of the file layout (e.g., as defined by metadata) of file system 310. The data blocks of "active" file system 310 are only copied to snapshot 318 when they are modified or removed. The term "active file system" refers to the currently active file system of storage system 300.

Operating system 300 also includes traditional volumes 370-374. As described above, traditional volumes 370-374 have a fixed relationship with the disks of storage subsystem 360. Operating system 300 further includes virtual volume 376 and aggregate 380. In an embodiment, virtual volume 376 is a logical data container that can be sized, resized, managed, and moved independently from the underlying physical storage. Virtual volume 376 decouples what was, in conventional volumes, a direct connection between volumes and their associated physical disks. This decoupling of virtual volumes and physical disks vastly increases the flexibility and storage efficiency of operating system 300.

In contrast to conventional systems, the underlying storage for virtual volume 376 is no longer directly provided by disks. Instead, virtual volume 376 obtains storage from aggregate 380. The storage for Aggregate 380, in turn, is provided by storage subsystem 360.

Figure 4:
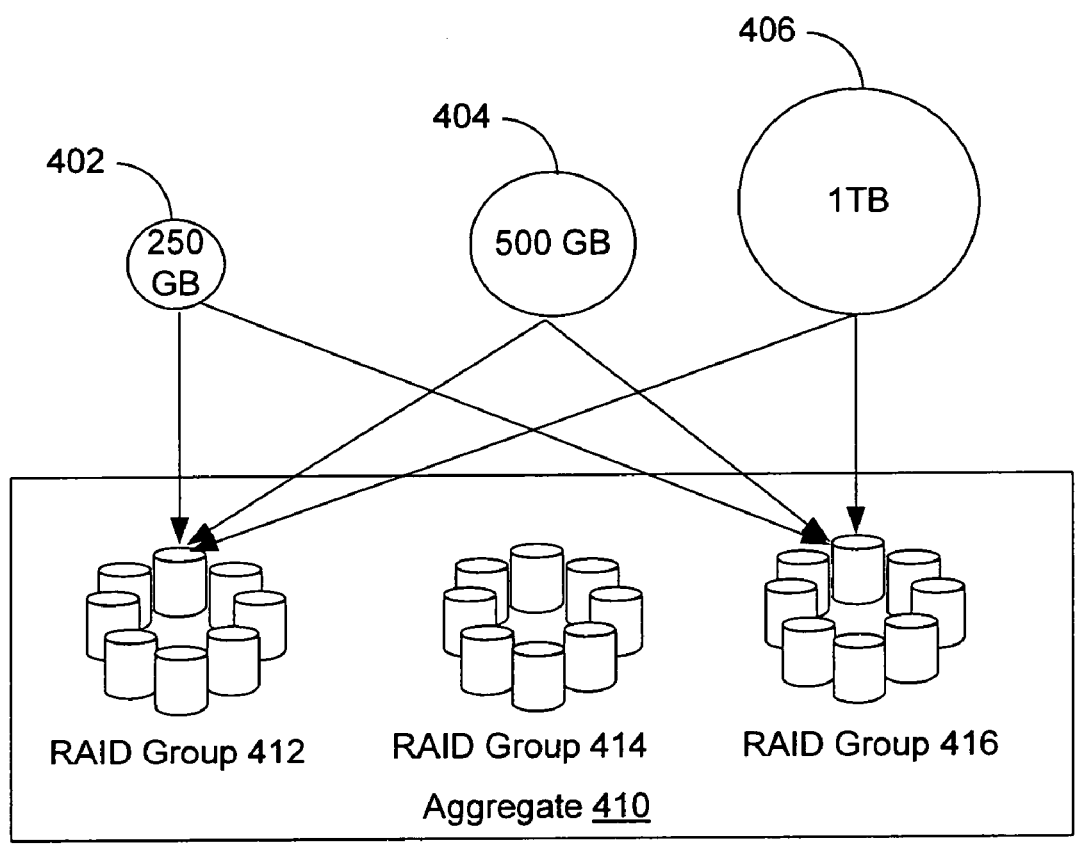
FIG. 4 is a block diagram illustrating selected relationships between a number of virtual volumes and an aggregate, according to an embodiment of the invention.

FIG. 4 is a block diagram illustrating selected relationships between virtual volumes 402-406 and aggregate 410, according to an embodiment of the invention. Aggregate 410 provides a common pool of physical storage to virtual volumes 402-406. In the illustrated embodiment, this common pool of physical storage includes RAID groups, 412-416. The common pool of physical storage is not, however, limited to RAID groups. Instead, it can include any storage technology suitable for mass storage. The arrows connecting virtual volumes 402-406 to aggregate 410 illustrate that each virtual volume may store data in any or all of RAID groups 412-416. The common pool of physical storage provided by aggregate 410 enables a more efficient storage architecture for a number of reasons. For example, unused disk space can be allocated to any virtual volume that needs it. The disk space is allocated from the aggregate rather than directly from the underlying physical storage. Thus, virtual volumes can be sized and resized independently of the physical storage.

Since a virtual volume can be sized independently of the physical storage, in an embodiment, it is possible to "overprovision" a virtual volume. Overprovisioning refers to allocating more space to the virtual volume (or a set of virtual volumes) than is actually available in the physical storage. Using virtual volume 404 as an example, an additional 500 GB may be allocated to virtual volume 404 even if there are only 1.75 TBs of physical storage space available to aggregate 410.

Referring again to FIG. 3, operating system 300 illustrates that many storage systems include legacy traditional volumes (e.g., traditional volumes 370-374) that do not provide the advantages of a virtual volume. To provide the advantages of a virtual volume, these traditional volumes must be migrated to one or more virtual volumes. In an embodiment, migration module 362 migrates one or more traditional volumes (e.g., traditional volumes 370-374) to one or more virtual volumes (e.g., virtual volume 376).

As is further described below, in one embodiment, the migration of a traditional volume to a virtual volume is done without data copying. The term "data copying" refers to copying the data stored in a traditional volume to a virtual volume. A migration technique that involves data copying requires that a storage system have spare storage capacity because (at least some) data is stored in two locations at (substantially) the same time (e.g., the traditional volume providing the data source and the virtual volume providing the data destination). Data copying is also a relatively slow process because it involves executing a large number of copy operations.

As the name implies, file system 310 stores data as one or more files. The structure of each file is defined by file metadata. In an embodiment, the file metadata is organized into one or more index nodes (or, for ease of reference, "nodes"). Typically a volume (either a traditional volume or a virtual volume) has a large number (e.g., thousands) of inodes. As is further described below, the structure of a traditional volume inode is different than the structure of a virtual volume inode. In an embodiment, migration module 362 migrates a traditional volume to a virtual volume by converting each traditional volume inode to a virtual volume inode.

Figure 5A:
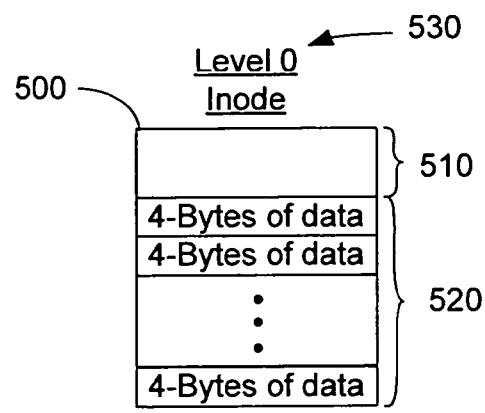
FIG. 5A is a block diagram illustrating a traditional volume inode.

FIG. 5A is a block diagram illustrating one example of a traditional volume inode 500. Traditional volume inode 500 includes inode metadata 510 and inode entries 520. Inode metadata 510 stores information about the inode such as date of inode creation, name of the person who created the inode, etc. For a small file (e.g., less than 64 bytes), data is stored directly in inode entries 520. For a larger file, each inode entry contains a physical block number that points to either a data block or an indirect block. The purpose of a physical block number is to enable the file system to determine where in physical storage the data is stored. Data blocks and indirect blocks are further discussed below with reference to FIGS. 5B and 8. In the illustrated example, inode 500 has 16 inode entries 520 and each entry is 4 bytes long, which allows it to store up to 64 bytes of data. It is to be appreciated, however, that the migration technique described herein is applicable to a wide range of data structures that describe file layouts such as: data structures other than inodes, inodes having an arbitrary number of entries, and/or inodes having entries of arbitrary length. As shown by reference number 530, inode 500 is a "level 0" inode. A level 0 inode refers to an inode that directly stores data (rather than block numbers).

Figure 5B:
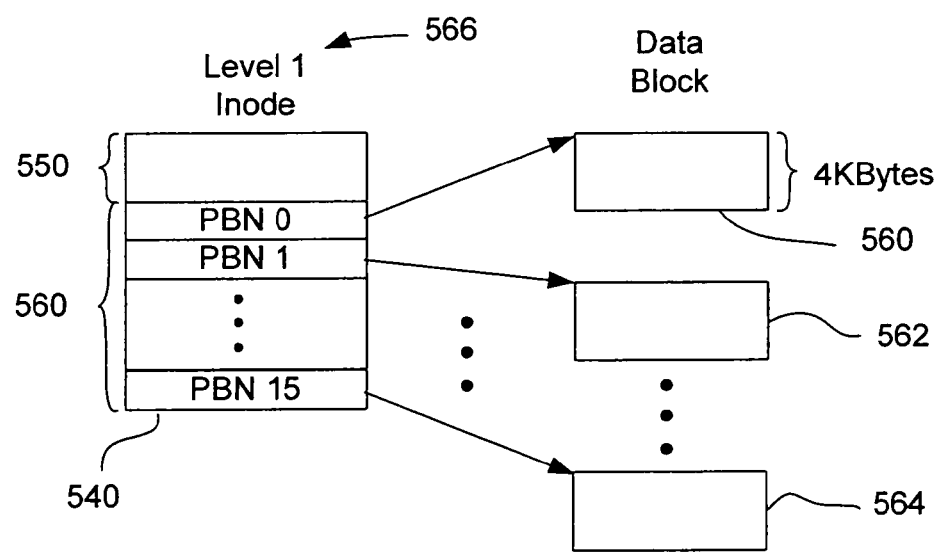
FIG. 5B is a block diagram of a traditional volume inode referencing a number of data blocks.

FIG. 5B is a block diagram of traditional volume inode 540. Inode 540 includes inode metadata 550 and inode entries 560. Inode 540 illustrates an example in which each inode entry contains a physical block number that points to a data block (e.g., data blocks 560-564). As shown by reference number 566, inode 540 is a "level 1" inode. A level 1 inode is an inode that contains physical block numbers that directly point to the corresponding physical data blocks. In the illustrated example, each data block can hold 4 KB of data. In such an example, a level 1 inode can point to 64 KB of data.

If the file described by the inode is larger than 64 KB, then the inode can reference an arbitrary number of levels of indirect blocks. An indirect block is a data block that contains block numbers (e.g., pointers) rather than data. Each added level of indirect blocks expands the number of data blocks that can be referenced by an inode. The term "buffer tree" refers to the inode and its associated levels of indirect blocks (if any). In those cases where the file is small enough to be referenced directly by the inode (e.g., as in FIG. 5B), then the buffer tree is simply the inode.

Figure 6:
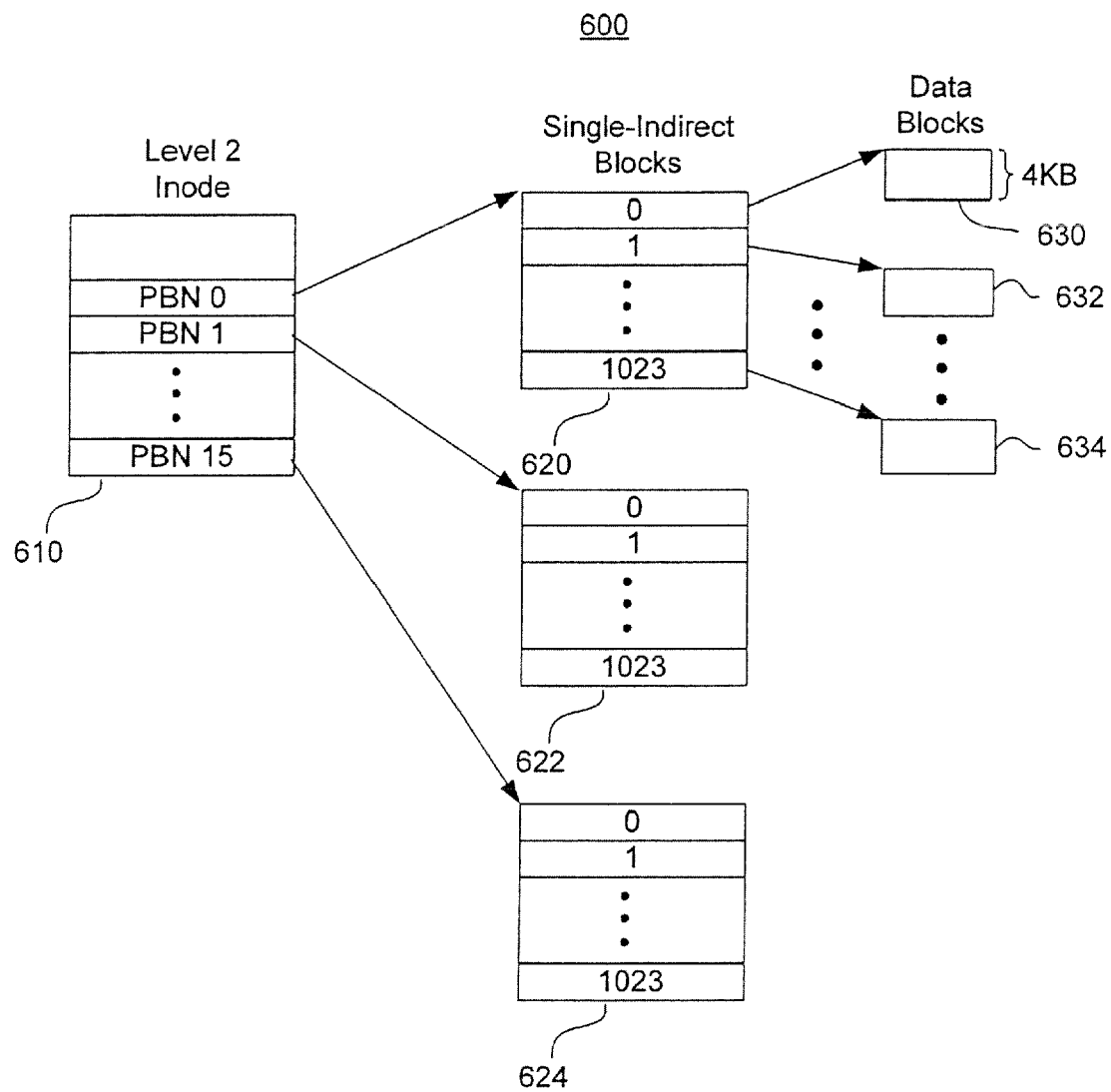
FIG. 6 is a block diagram of a traditional volume buffer tree.

FIG. 6 is a block diagram of traditional buffer tree 600. Traditional buffer tree 600 includes level 2 inode 610, single-indirect blocks 620-624, and data blocks 630-634. The terms single-indirect, double-indirect, and the like, refer to a level of indirection with respect to data blocks 630-634. For example, single-indirect blocks 620-624 directly reference data blocks 630-634. A double-indirect block (not shown), in turn, references a single-indirect block. An arbitrary number of levels of indirect blocks may be used depending on the number of data blocks that are referenced.

As introduced above, the structure of a virtual volume inode is different than the structure of a traditional volume inode. Similarly, a virtual volume buffer tree has a different structure than a traditional volume buffer tree. This reason for this difference is that each block of data in a virtual volume has a virtual location in the aggregate (e.g., aggregate 380, shown in FIG. 3) and a physical location on disk. Thus, referencing a block of data in a virtual volume involves a virtual address (e.g., identifying a logical location in the aggregate) and a physical address (e.g., identifying a physical location on disk). In one embodiment, a virtual volume inode has a dual-address structure to contain both virtual address information and physical address information. In such an embodiment, the term "dual-address buffer tree" refers to virtual volume buffer tree having the dual-address structure.

Figure 7:
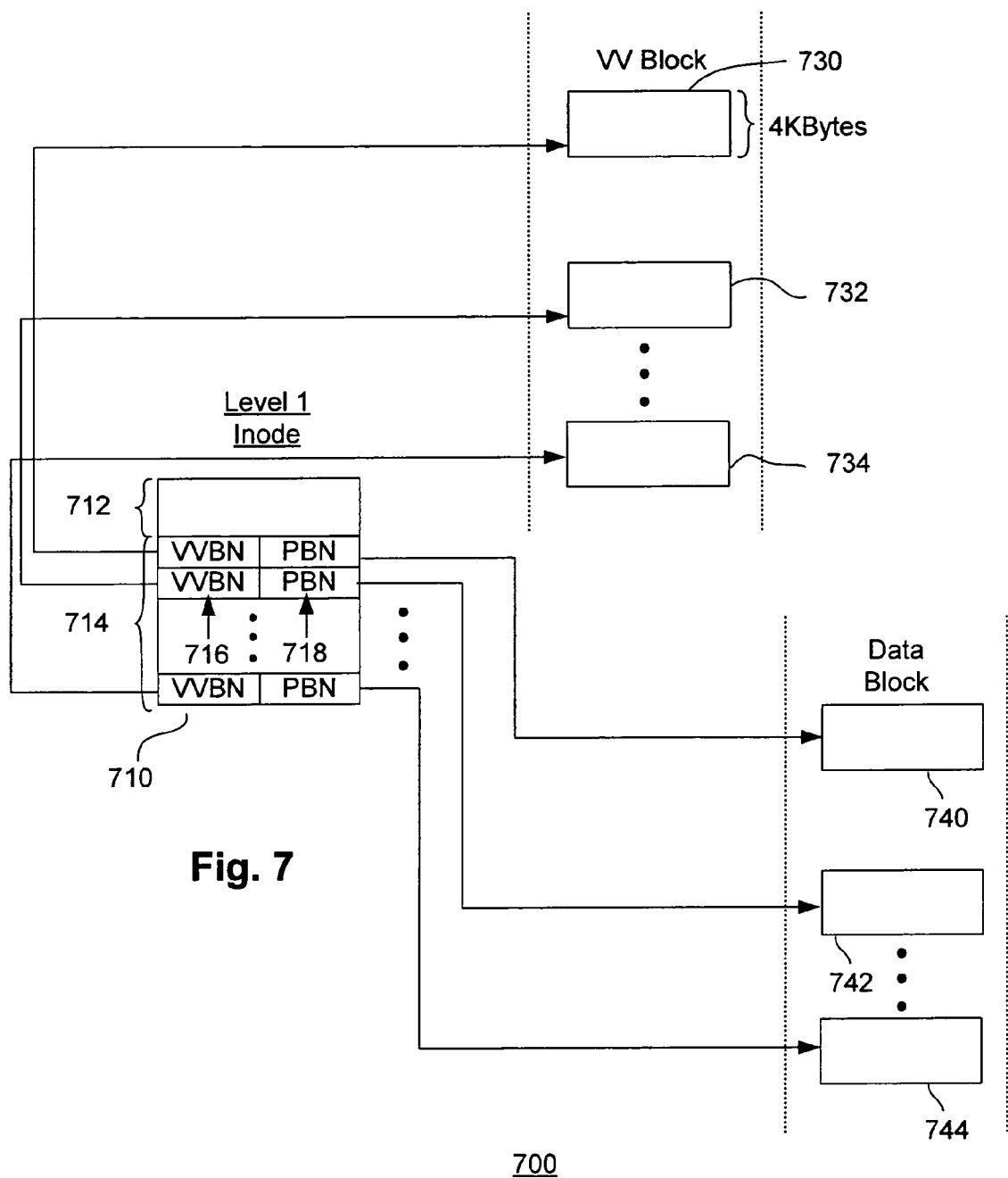
FIG. 7 is a block diagram of a dual-address buffer tree, implemented according to an embodiment of the invention.

FIG. 7 is a block diagram of dual-address buffer tree 700, implemented according to an embodiment of the invention. Dual-address buffer tree 700 includes virtual volume inode 710, virtual volume blocks 730-734, and physical data blocks 740-744. Virtual volume inode 710 includes inode metadata 712 and inode entries 714. In an embodiment, each virtual volume inode entry includes a virtual address (e.g., virtual volume block number 716) and a physical address (e.g., physical block number 718). In an embodiment, the virtual address is a reference to a virtual volume block number that specifies where within an aggregate the data is logically located. The physical address is a reference to a physical data block where the data is stored.

Figure 8:
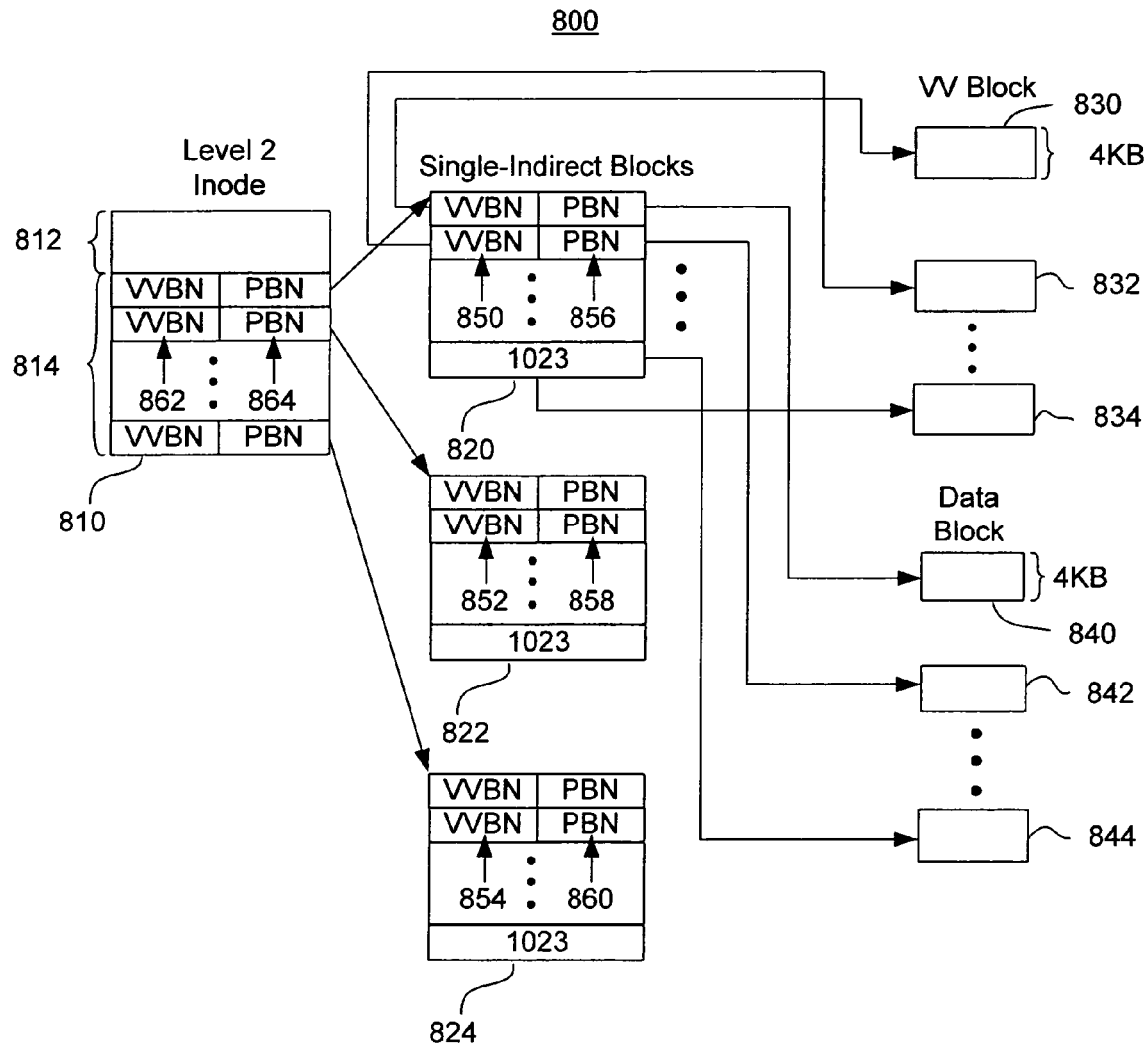
FIG. 8 is a block diagram of a dual-address buffer tree, implemented according to an embodiment of the invention.

FIG. 8 is a block diagram of dual-address buffer tree 800, implemented according to an embodiment of the invention. Dual-address buffer tree 800 includes virtual volume inode 810, single-indirect blocks 820-824, virtual volume blocks 830-834, and data blocks 840-844. Each entry of single-indirect blocks 820-824 includes a virtual address (e.g., virtual volume block numbers 850-854) and a physical address (e.g., physical block numbers 856-860). The virtual address specifies where within an aggregate the data logically resides and the physical address specifies where the data is physically stored on disk.

Virtual volume inode 810 includes inode metadata 812 and inode entries 814. Each inode entry includes a virtual address (e.g., virtual volume block number 862) and a physical address (e.g., physical block number 864). The virtual address specifies where within the aggregate a corresponding single-indirect block logically resides and the physical address specifies where the single-indirect block is physically stored on disk. Dual-address buffer tree 800 can be expanded, as needed, to include additional levels of indirect blocks (e.g., double-indirect blocks, triple-indirect blocks, etc.). In an embodiment, the entries of each indirect block have the dual-address structure shown in FIG. 8. In general, the entries of an indirect block at a given level of indirection provide virtual and physical addresses for either an indirect block of the next lower level of indirection or, in the case of a single-indirect block, for a data block.

In an embodiment, operating system 300 maintains one or more data structures to support, inter alia, migrating a traditional volume to a virtual volume. For example, the illustrated embodiment includes physical storage bitmap 312, container file bitmap 314, and or inomap file 316. Physical storage bitmap 312 is used to identify free data blocks and inomap file 316 is used to identify free inodes. The term "container file" refers to a file that specifies that layout of an aggregate. In one embodiment, container file bitmap 314 identifies which virtual volume blocks of an aggregate are available for use. The term "bitmap," as used herein, broadly refers to a binary representation of an object (e.g., a file, data block, etc.) that is used to track aspects of the object (e.g., free space). The size of the entries in the bitmap are not limited to a single bit. For example, in an embodiment, eight bits are used to track the status of a data block. In an alternative embodiment, more data structures, fewer data structures, and/or different data structures are used to identify free blocks, free inodes, free virtual volume blocks, and the like.

Figure 9:
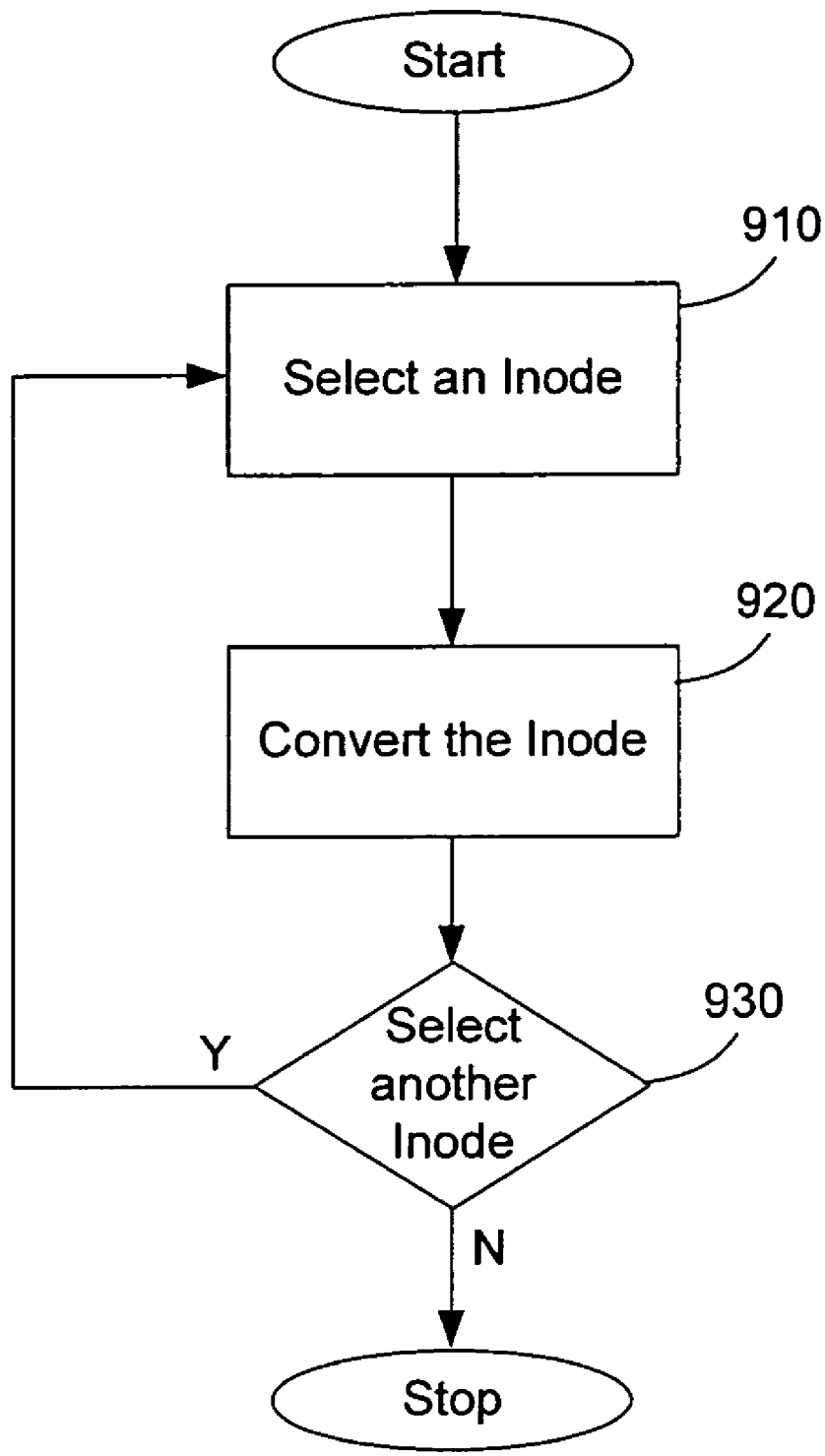
FIG. 9 is a high-level flow diagram illustrating certain aspects of a method for migrating a traditional volume to a virtual volume, according to an embodiment of the invention.
Figure 10:
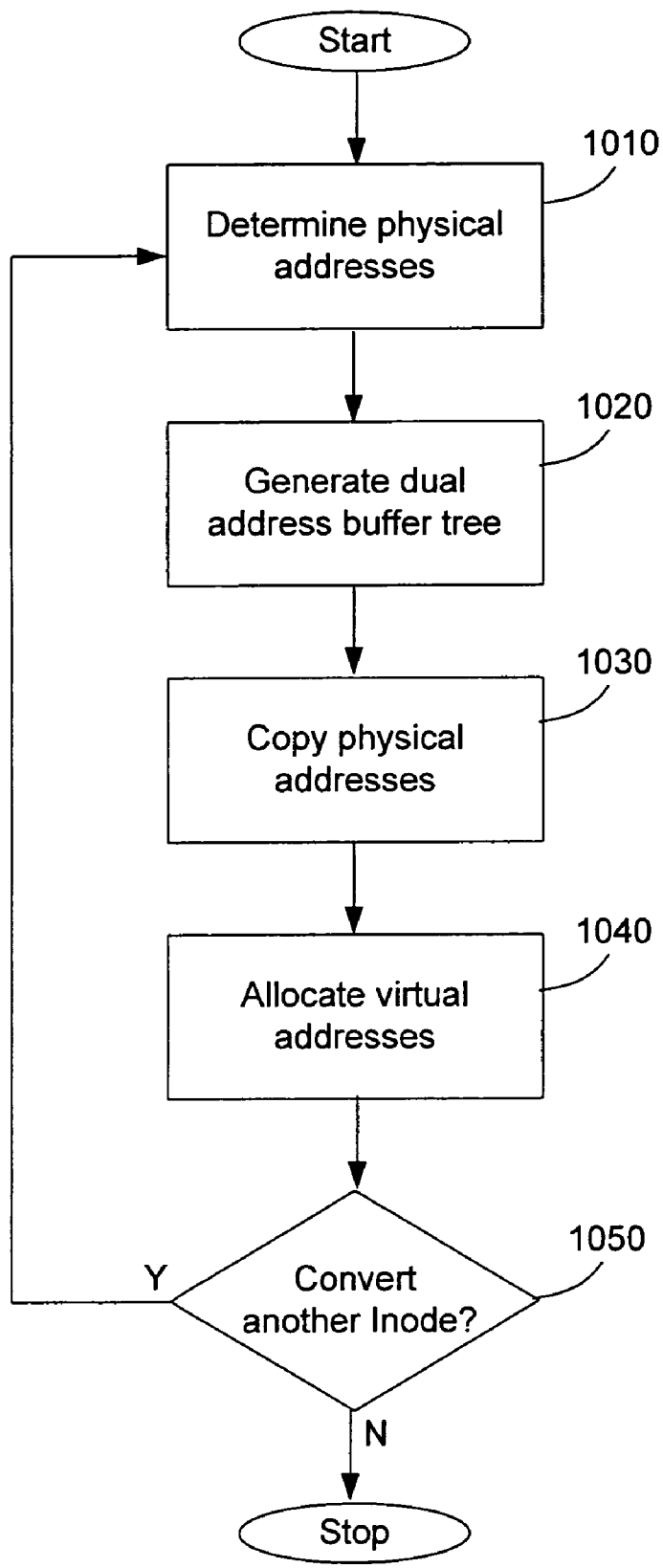
FIG. 10 is a flow diagram illustrating certain aspects of a method for converting a traditional volume inode to a virtual volume inode, according to an embodiment of the invention.
Figure 11:
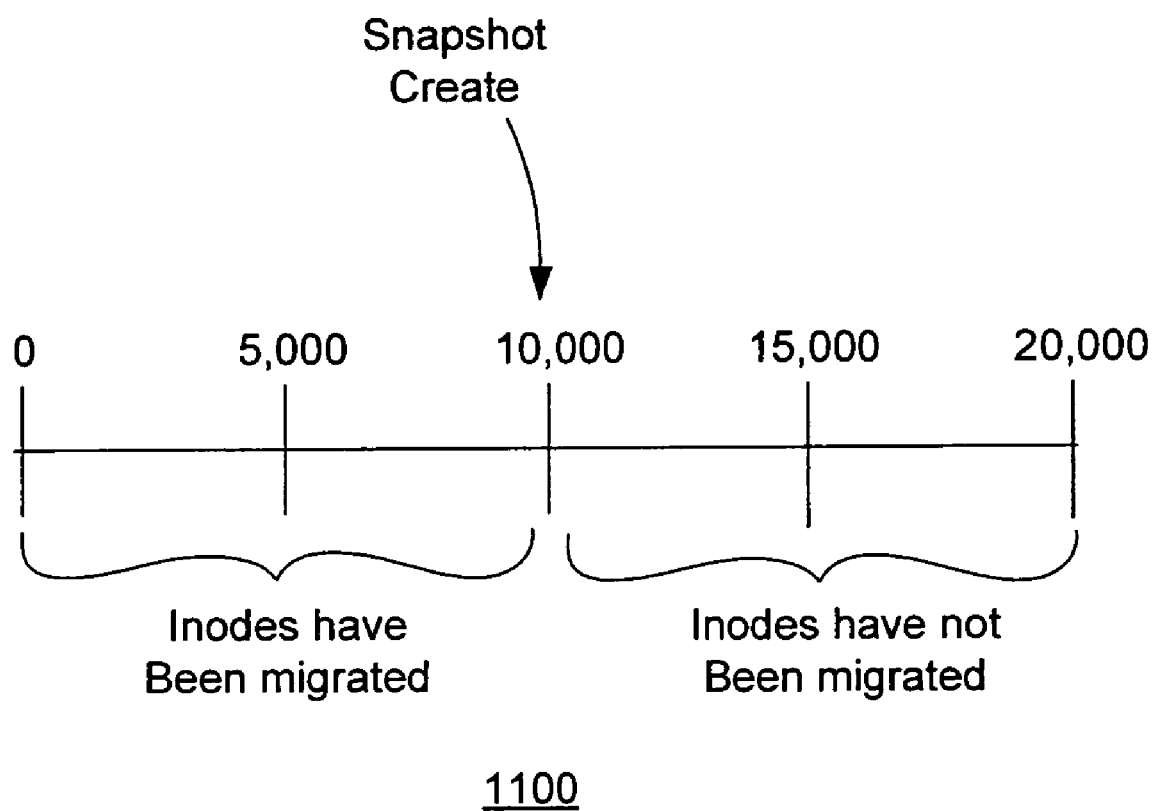
FIG. 11 is a conceptual illustration of a snapshot being created while a volume is being migrated from a traditional volume to a virtual volume.

Turning now to FIG. 9-11, the particular methods associated with embodiments of the invention are described in terms of computer software and hardware with reference to a flowchart. The methods to be performed by a computing device (e.g., a storage system) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 9 is a high-level flow diagram illustrating certain aspects of a method for migrating a traditional volume to a virtual volume, according to an embodiment of the invention. The migration process includes converting the metadata defining a traditional volume to metadata that has the dual-address structure of a virtual volume. More specifically, in an embodiment, each traditional volume inode is migrated to a virtual volume inode. Since the migration process involves converting the structure of metadata, there is no need to copy data stored in the traditional volume. The migration process, therefore, does not require additional storage resources and can be executed relatively quickly (in comparison to mass data copying).

A user (or another system) may select a traditional volume for migration using, for example, a graphical user interface of a storage system or of a management console. The storage system (e.g., storage system 300, shown in FIG. 3) includes a migration module (e.g., migration module 362) to provide the migration capability. In an embodiment, the migration module converts the traditional volume to a virtual volume on an inode-by-inode basis. Referring to process block 910 the migration module selects an inode of the traditional volume. The selection of the inode may be based on any of a number of selection criteria. In one embodiment, the migration module uses an inomap (e.g., inomap file 316) to identify and select the inodes of the traditional volume.

Referring to process block 920, the migration module converts the traditional volume inode to a virtual volume inode. In one embodiment, the conversion process includes converting the structure of the traditional volume inode to a dual address structure of a virtual volume inode. The process of converting the traditional volume inode to a virtual volume inode is further discussed below with reference to FIG. 10. The process may be repeated, as needed, until all of the inodes in the traditional volume have been converted as shown by 930.

FIG. 10 is a flow diagram illustrating certain aspects of a method for converting a traditional volume inode to a virtual volume inode, according to an embodiment of the invention. Referring to process block 1010, the migration module determines the physical addresses of the data blocks referenced by the traditional volume inode. If the traditional volume inode is a level 1 inode (inode 540, shown in FIG. 5B), then the physical addresses are obtained from the inode itself. If the traditional volume inode is part of a buffer tree having one or more levels of indirect blocks, then the physical addresses are obtained from the single-indirect blocks (e.g., single-indirect blocks 620-624, shown in FIG. 6).

Referring to process block 1020, at least a part of a dual-address buffer tree is generated to contain metadata for the virtual volume inode. In an embodiment, generating the dual-address buffer tree includes generating one or more dual-address single-indirect blocks (e.g., single-indirect blocks 820-824). The dual-address single-indirect blocks include entries that hold both virtual addresses and physical addresses. The virtual addresses and physical addresses of the dual-address single-indirect blocks directly reference corresponding physical data blocks and virtual volume blocks respectively.

Referring to process block 1030, the physical addresses obtained from the traditional volume buffer tree are copied to the dual-address single-indirect blocks. In an embodiment, each physical address is copied to an entry of a dual-address single-indirect block. In one embodiment, if the traditional volume buffer tree includes an inode that directly references its associated data blocks (e.g., inode 540, shown in FIG. 5), then there is no need to generate the one or more dual-address single-indirect blocks. Instead, a virtual volume inode is generated and the physical addresses obtained from the traditional volume buffer tree are copied to the virtual volume inode.

Referring to process block 1040, the migration module allocates virtual addresses to the dual-address single-indirect blocks. The term "allocates" refers, for example, to determining the addresses of available virtual volume blocks and assigning those addresses to the dual-address single-indirect blocks. In an embodiment, the migration module uses a container file bitmap (e.g., container file bitmap 314, shown in FIG. 3) to identify available virtual volume blocks.

Depending on the size of the file described by a dual-address buffer tree, there may be additional levels of indirection beyond the single-indirect level. In such cases, the migration process begins at the single-indirect level as described above. The single-indirect blocks of the single-indirect level are then copied to physical storage and a physical address is obtained for each single-indirect block. The migration module allocates a virtual address for each of the physical addresses. The virtual address and physical address of a present level of indirection or stored in the blocks of the next-higher level of indirection. This process may be continued for an arbitrary number of levels of indirection.

As described above, a snapshot (e.g., snapshot 318, shown in FIG. 3) is a read-only copy of the active file system at a given moment in time. In an embodiment, snapshots are structured as a number (often a large number) of inodes, just as the active file system is structured as a number of inodes. In such an embodiment, a snapshot of a traditional volume can be migrated to a snapshot of a virtual volume. If the snapshot was created prior to the migration of the active file systems, then the migration process is substantially the same for the snapshot as it is for the active file system.

In some cases, a snapshot may be created after the migration process for the active file system has started. In such cases, the active file system may include both traditional volume inodes and virtual volume inodes. FIG. 11 is a conceptual illustration of a snapshot being created while volume 1100 is being migrated from a traditional volume to a virtual volume. In the illustrated example, the snapshot is created at a point in time when the first 10,000 inodes of volume 1100 have been migrated but the second 10,000 inodes have not yet been migrated. In one embodiment, the migration module creates the snapshot as a virtual volume. For each inode in volume 1100, the migration module determines whether the inode has been migrated. If the inode has already been migrated then it is copied to the virtual volume snapshot. If the inode has not yet been migrated, then the migration module migrates the inode "on-the-fly." That is, the migration module migrates the inode as described above with reference to FIGS. 9-10.

In an embodiment, a traditional volume remains on-line while it is being migrated. A user may attempt to access an inode of the volume before the migration process is complete. In one embodiment, the migration module determines whether the inode that the user has attempted to access has been migrated. If so, then the migration module permits access to the inode. If not, then the migration module migrates the inode on-the-fly in substantially the same manner as described above with reference to FIGS. 9-10.

Elements of embodiments of the present invention may also be provided as a machine-readable medium for storing the machine-executable instructions. The machine-readable medium may be a machine-readable storage medium or a machine-readable transmission medium. The machine-readable storage medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, or other type of machine-readable storage media suitable for storing electronic instructions. The machine-readable transmission medium may may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method for migrating a traditional volume to a virtual volume without data copying, the method comprising:

selecting a traditional volume index node; and
converting a structure of the traditional volume index node to a dual address structure of a virtual volume index node, wherein the virtual volume index node includes physical address information and virtual address information, wherein converting the structure of the traditional volume index node to the dual address structure of the virtual volume index node comprises:
determining one or more physical addresses for a corresponding one or more data blocks based, at least in part, on a traditional volume buffer tree of the traditional volume index node;
generating, at least in part, a dual address buffer tree having the virtual volume index node;
copying the one or more physical addresses for the corresponding one or more data blocks to the dual address buffer tree; and
allocating a virtual address for each of the one or more physical addresses, wherein each virtual address specifies a virtual volume block corresponding to one of the one or more physical addresses.

2. The method of claim 1, wherein the traditional volume buffer tree further includes one or more levels of traditional volume indirect blocks including at least one traditional volume single-indirect block and wherein generating, at least in part, the dual address buffer tree further comprises generating a dual address single-indirect block.

3. The method of claim 2, wherein copying the one or more physical addresses for the corresponding one or more data blocks to the dual address buffer tree comprises:
copying the one or more physical addresses for the corresponding one or more data blocks to the dual address single-indirect block.

4. The method of claim 3, further comprising:
storing the dual address single-indirect block to a physical address in a physical storage;
determining a virtual address for the dual address single-indirect block; and
writing both the physical address and the virtual address of the dual address single-indirect block to a next higher indirect block of the dual address buffer tree.

5. The method of claim 1, wherein the traditional volume buffer tree is a traditional volume buffer tree for at least one of:
an active file system; and
a previously generated snapshot of the active file system.

6. The method of claim 1, further comprising:
detecting an attempted access of a selected index node of the traditional volume;
determining whether the selected index node has been migrated to the virtual volume; and
providing access to the selected index node, if the selected index node has been migrated to the virtual volume.

7. The method of claim 6, further comprising:
converting the selected index node to another virtual volume index node responsive, at least in part, to the attempted access, if the selected index node has not been migrated to the virtual volume.

8. The method of claim 7, wherein migrating the selected index node to the other virtual volume index node comprises:
determining one or more physical addresses for a corresponding one or more data blocks based, at least in part, on a traditional volume buffer tree of the selected index node;
generating, at least in part, another dual address buffer tree having the other virtual volume index node;
copying the one or more physical addresses for the corresponding one or more data blocks to the dual address buffer tree; and
allocating a virtual address for each of the one or more physical addresses, wherein each virtual address specifies a virtual volume block corresponding to one of the one or more physical address.

9. The method of claim 1, wherein allocating the virtual address for each of the one or more physical addresses further comprises:
referencing a bitmap indicating one or more available blocks in the virtual volume; and
selecting an available block in the virtual volume from the bitmap, wherein the available block has an associated virtual address; and
allocating the associated virtual address to a physical address.

10. A system comprising:
a file system to maintain a hierarchical structure of data stored in an array of physical storage devices and to service read and write requests from one or more clients relating to data stored in the array of physical storage devices;
a traditional volume having one or more traditional volume index nodes, wherein each traditional volume index node is to provide physical address information relating to data stored in the array of physical storage devices; and
a migration module to migrate the traditional volume to a virtual volume, wherein the virtual volume is to include one or more virtual volume index nodes to provide both physical address information and virtual address information relating to data stored in the array of physical storage devices, wherein the migration module comprises logic to:
select a traditional volume index node: and
convert a structure of the traditional volume index node to a dual address structure of a virtual volume index node, wherein the virtual volume index node includes physical address information and virtual address information, wherein the logic to convert the structure of the traditional volume index node to the dual address structure of the virtual volume index node comprises logic to:
determine one or more physical addresses for a corresponding one or more data blocks based, at least in part, on a traditional volume buffer tree of the traditional volume index node;
generate, at least in part, a dual address buffer tree having the virtual volume index node;
copy the one or more physical addresses for the coffesponding one or more data blocks to the dual address buffer tree; and
allocate a virtual address for each of the one or more physical addresses, wherein each virtual address specifies a virtual volume block coffesponding to one of the one or more physical addresses.

11. The system of claim 10, wherein the traditional volume buffer tree is a traditional volume buffer tree for at least one of:
an active file system; and
a previously generated snapshot of the active file system.

12. An article of manufacture comprising:
an machine-readable storage medium storing instructions that, when executed by an apparatus, cause the apparatus to
select a traditional volume index node; and convert a structure of the traditional volume index node to a dual address structure of a virtual volume index node, wherein the virtual volume index node includes physical address information and virtual address information, wherein the instructions that, when executed by the apparatus, cause the apparatus to convert the structure of the traditional volume index node to the dual address structure of the virtual volume index node cause the apparatus to:

determine one or more physical addresses for a corresponding one or more data blocks based, at least in part, on a traditional volume buffer tree of the traditional volume index node;

generate, at least in part, a dual address buffer tree having the virtual volume index node;

copy the one or more physical addresses for the corresponding one or more data blocks to the dual address buffer tree; and allocate a virtual address for each of the one or more physical addresses, wherein each virtual address specifies a virtual volume block coffesponding to one of the one or more physical addresses.

13. The article of manufacture of claim 12, wherein the traditional volume buffer tree further includes one or more levels of traditional volume indirect blocks including at least one traditional volume single-indirect block and wherein the instructions that, when executed by the apparatus, cause the apparatus to generate, at least in part, the dual address buffer tree further cause the apparatus to generate a dual address single-indirect block.

14. The article of manufacture of claim 12, wherein the traditional volume buffer tree is a traditional volume buffer tree for at least one of:

an active file system; and a previously generated snapshot of the active file system.

15. The article of manufacture of claim 12, wherein the instructions, when executed by the apparatus, further cause the apparatus to:

detect an attempted access of a selected index node of the traditional volume;

determine whether the selected index node has been migrated to the virtual volume; and provide access to the selected index node, if the selected index node has been migrated to the virtual volume.

16. The article of manufacture of claim 12, wherein the instructions, when executed by the apparatus, further cause the apparatus to:

convert the selected index node to another virtual volume index node responsive, at least in part, to the attempted access, if the selected index node has not been migrated to the virtual volume.

17. A method for migrating a traditional volume to a virtual volume without data copying, the method comprising:

selecting a traditional volume index node; and converting the traditional volume index node to a virtual volume index node, wherein the virtual volume index node includes physical address information and virtual address information, wherein converting the traditional volume index node to the virtual volume index node comprises:

determining one or more physical addresses for a coffesponding one or more data blocks based, at least in part, on a traditional volume buffer tree of the traditional volume index node;

generating, at least in part, a dual address buffer tree having the virtual volume index node;

copying the one or more physical addresses for the corresponding one or more data blocks to the dual address buffer tree; and allocating a virtual address for each of the one or more physical addresses, wherein each virtual address specifies a virtual volume block coffesponding to one of the one or more physical addresses.

* * * * *